O. J. SALISBURY.
METHOD OF AND APPARATUS FOR FILTRATION.
APPLICATION FILED AUG. 29, 1917.
1,336,444.
Patented Apr. 13, 1920.
2 SHEETS-SHEET 2
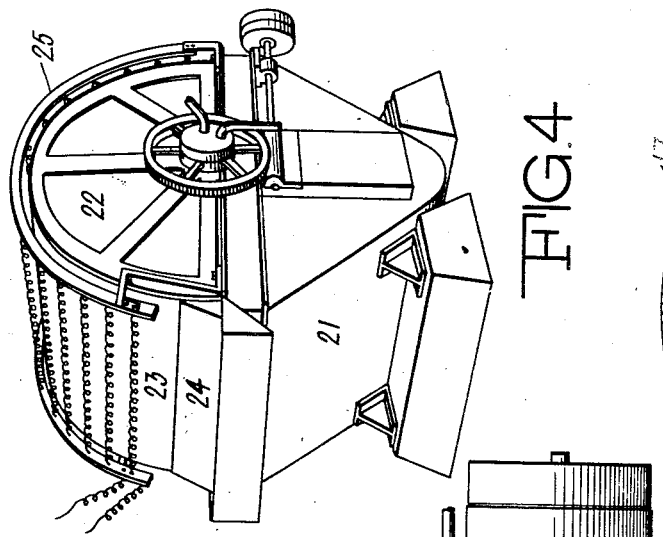
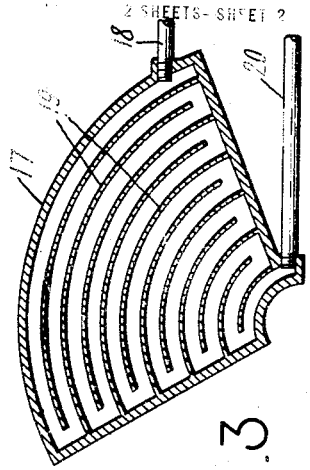
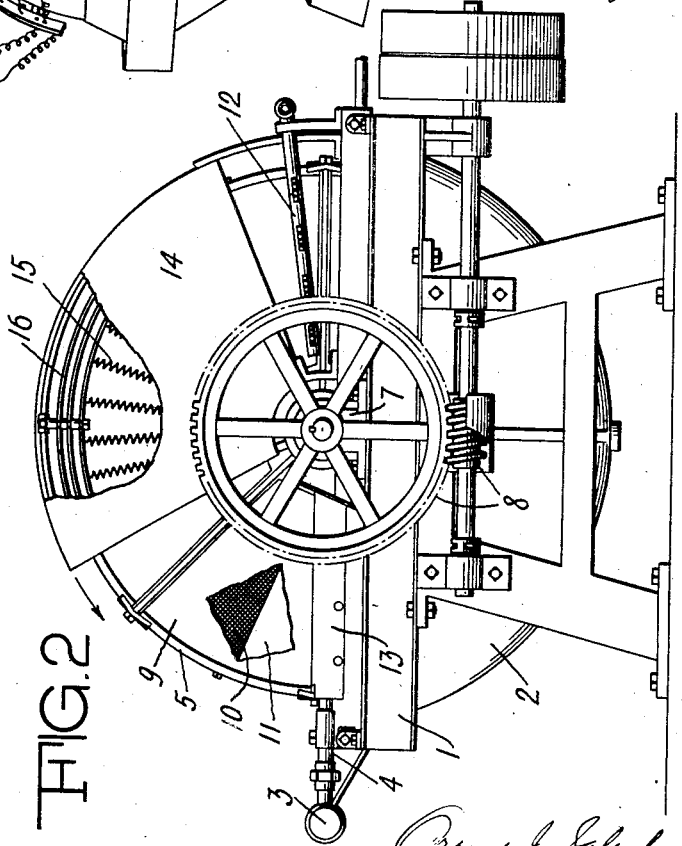

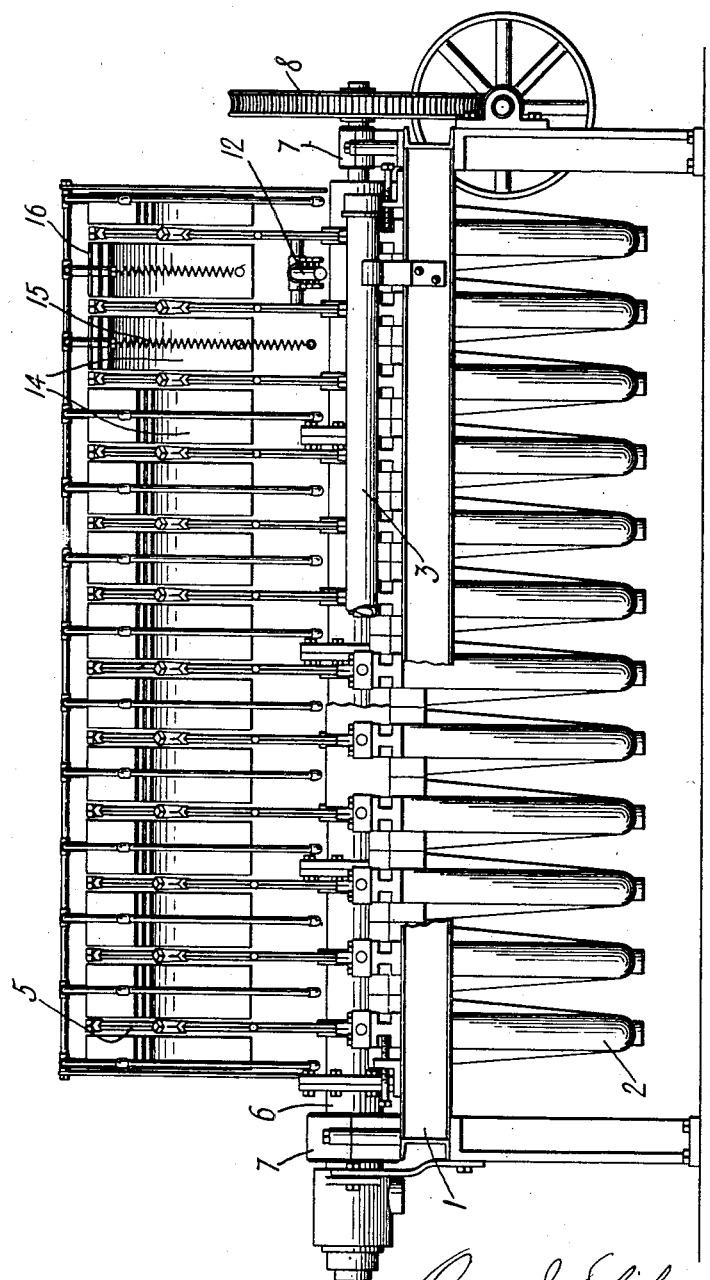

UNITED STATES PATENT OFFICE.

ORANGE J. SALISBURY, OF SALT LAKE CITY, UTAH, ASSIGNOR TO UNITED FILTERS CORPORATION, OF SALT LAKE CITY, UTAH, A CORPORATION OF DELAWARE.

METHOD OF AND APPARATUS FOR FILTRATION.

1,336,444. Specification of Letters Patent. Patented Apr. 13, 1920.

Application filed August 29, 1917. Serial No. 188,704.

*To all whom it may concern:*

Be it known that I, ORANGE J. SALISBURY, a citizen of the United States, residing at Salt Lake City, county of Salt Lake, State of Utah, have invented certain new and useful Improvements in Methods of and Apparatus for Filtration, of which the following is a specification.

In many industries employing filtration processes, it is desirable to have the residue or cake discharged from the filter as dry as possible, and the present invention relates to a method of and means for accomplishing this result in an expeditious and inexpensive manner. In filtering a great many substances, the residue remaining after the filtrate has passed through the filtering medium, remains on the outside of the filtering medium in the form of a cake, and in accordance with my invention, I dry this cake, while still on the filtering medium, by the application of heat. This I preferably accomplish by placing adjacent to the cake on the filter medium, a source of heat, or heated body, the heat from which will dry the cake. Where a pressure difference exists between the sides of the filter medium, as in pressure or suction filters, currents of heated air are forced or drawn through the cake, which dry the same.

The application of the heat to the cake for drying the same may be accomplished in various ways, and the invention may be utilized in connection with almost any type of filter. For the purpose of illustrating the invention and the best mode now known to me for practising the same, I have shown the invention as employed in connection with a filter of the continuous suction type, but the invention is not limited to this kind of filter.

In the accompanying drawings which form a part of this specification, Figure 1 is a side elevation of a continuous suction filter, parts being broken away, embodying one form of apparatus by which the invention may be practised. Fig. 2 is an end view of the apparatus shown in Fig. 1, parts being broken away. Fig. 3 is a transverse sectional view of the modified form of heating element. Fig. 4 is a perspective view illustrating an application of the invention to a different form of filter.

Referring to the drawings in detail, the filter shown in Figs. 1 and 2 is a continuous suction filter of the rotary disk type. It comprises a framework 1 carrying a plurality of pans or troughs 2, into which the unfiltered liquid is fed through a manifold 3, having branch pipes 4 into each of the troughs. 5 are the revolving filter disks or plates which are mounted on a hollow shaft 6 supported in suitable bearing 7 on the frame 1 and arranged to be rotated by the gearing 8, preferably continuously at a slow rate of speed. One of the disks 5 dips into each of the troughs 2. The disks 5 are illustrated as built up of a number of segmental filter plates 9 which are hollow and are connected to the hollow shaft 6. The filter plates may be of any suitable construction, and are illustrated as comprising a central grid or support 10 covered with a filtering material such as the canvas 11. Suction is applied to the interior of the filter plates through the hollow shaft. The disks revolve in the direction of the arrow shown in Fig. 2, and while submerged in the unfiltered liquid in the troughs the filtrate is drawn through the filtering medium to the interior of the plates by the suction, and passes off through the hollow shaft, while the non-filterable residue adheres to the outer surfaces of the plates in the form of a cake. In cases where it is desired to wash the cake, suitable means are provided for this purpose, such as the spray pipes 12, which direct jets of water against the cake as the surfaces of the disks rotate out of the troughs. Scrapers 13 are preferably provided to remove the cake and clean the surfaces of the disks before the filtering surface again passes into the troughs.

The construction thus far described is well known in the art, and comprises one form of continuous suction filter. In the illustrated application of my invention to this filter, I provide a number of heating elements located between the upper portions of the disks so that after the cake which has formed on the disks leaves the troughs it passes close to the heating elements and is heated and dried by direct radiation and by the currents of air heated by the heating elements which are drawn through the cake and into the interior of the filter plates by the suction in the hollow shaft. The cake is thus dried before it is removed from the plates by the scrapers 13.

In the construction illustrated, the heating elements comprise sector-shaped members 14 located between the disks and adjacent to the outer surfaces of the end disks, and provided with electrical resistance elements of any suitable construction, as indicated diagrammatically at 15. As illustrated, the resistance elements are located midway between the leaves, the heat being retained and directed against the cake on the disks by the inclosing members, reflectors or shrouds 16, attached to the outer portions of the heating elements and extending as close to the disks as possible, while permitting the cake to pass without being scraped off. As illustrated, the shrouds comprise a series of concentric members having air spaces between them, which cause the shrouds to act as heat insulators. The shrouds also prevent the passage through the cake of any but heated air currents. Where the cake is to be washed, as in the construction illustrated, the heating elements are located between the washing jets and the scrapers so that the cake is heated and dried after being washed.

Any suitable means of applying heat may be employed. For example, instead of the electrically heated segments, steam heated segments, such as shown in Fig. 3, may be employed. As here illustrated, the steam enters a hollow sector-shaped casing 17 through a pipe 18, and passes back and forth around a series of baffle-plates 19 and out through a pipe 20.

In Fig. 4 the application of the invention in shown to a suction filter of the revolving drum type. The filter here illustrated comprises a trough 21 in which revolves a drum 22 having a cylindrical filtering surface 23. Suction is applied to the interior of the drum through a hollow shaft. As the drum revolves, the cake is formed on the filtering surface, the filtrate being withdrawn through the hollow shaft. 24 is a scraper by which the cake is removed. In order to dry the cake before it reaches the scraper, a suitable heating element 25 is located adjacent to the exposed surface of the drum.

The drying of the cake while still on the filter medium by the application of heat thereto, is desirable as the material is spread out in such a way that the heat may be advantageously applied. It further avoids the necessity of separate means for handling the material, as would be necessary if the drying were carried out after the removal of the cake from the filter medium. Furthermore, where a pressure difference upon the two sides of the filter medium is utilized for producing the filtering action, by maintaining this pressure difference heated currents of air may be caused to pass through the cake so as to dry the same thoroughly. This is possible because of the porous condition in which the cake is left following the filtering operation. Furthermore, the same means for producing the pressure difference may be utilized for the drying as well as for the filtering operations.

As will be understood by those skilled in the art, numerous other applications of the invention than those illustrated may be made, and the invention may be utilized in connection with filters of various types. I therefore do not intend to limit myself to the specific applications of the invention set forth, but intend to claim my invention broadly, in whatever mode its principle may be employed.

Having thus described my invention, I claim:

1. In the art of filtration, the step which consists in drying the cake *in situ* by heat applied to the cake in the direction of the passage of the filtrate prior to the removal of the cake from the filter medium.

2. In the art of filtration, the method of drying the cake, which consists in passing a heated current of air through the cake while still on the filter medium.

3. In the art of filtration, the method of drying the cake which consists in maintaining a pressure difference over the opposite sides of the filter medium, and providing a source of heat upon the side of the filter medium where the pressure is the greater.

4. In the art of filtration, the method of drying the cake which consists in bodily moving the filter member with the formed cake thereon to bring the cake in proximity to a heated body before it is discharged from the filter medium.

5. The method of filtration which consists in immersing a filter medium in a liquid to be filtered, producing a pressure difference, causing the filtrate to pass through the filter medium, and deposit the residue on the surface of the filter medium in the form of a cake, removing the filter medium from the liquid, exposing the cake to the action of heat while still on the filter medium, and finally removing the cake when suitably dried from the filter medium.

6. The method of filtration which consists in slowly moving a filter medium through a bath of material to be filtered, while maintaining suction on the reverse side thereof, whereby the filtrate is drawn through the filter medium and a cake formed on the outside thereof, passing the filter medium with the cake thereon close to a source of heat, and removing the cake.

7. The process of filtration as set forth in claim 6, characterized by the continuance of the suction while the cake is in proximity to the source of heat.

8. The process of producing dried residuum after filtration, which consists in forming a filter cake on the filter medium in relatively thin layers and moving such layers slowly past a heated body.

9. In a filter, the combination of a filter medium, means for submerging the same in the liquid to be filtered, and means for subjecting the same to heat when not submerged.

10. In a filter, the combination of a filter medium, means for submerging the same in the liquid to be filtered, a heated body, and means for bringing the filter medium into proximity to said heated body when the filter medium is not submerged.

11. In a filter, the combination of a trough for the liquid to be filtered, a heated body, and a filter medium movable successively through said trough and into proximity to said heated body.

12. In a filter, the combination of a container for the liquid to be filtered, cake washing means, cake drying means, and cake removing means, and a filter medium adapted to be moved successively through said liquid container and past said cake washing, drying and removing means.

13. In a continuous suction filter, a trough for the liquid to be filtered, a hollow filtering member movable through said trough, means for maintaining suction within said member, and a heating member close to which said filtering member passes after it leaves said trough.

14. In a continuous suction rotary disk filter, the combination of a series of troughs for the liquid to be filtered, a hollow shaft, a series of hollow filtering disks mounted on said shaft and adapted to rotate in said troughs, and a series of heating elements located between said disks above said troughs.

15. In a continuous suction rotary disk filter, the combination of a series of troughs for the liquid to be filtered, a hollow shaft, a series of hollow filtering disks mounted on said shaft and adapted to rotate in said troughs, and a series of heating elements located between said disks above said troughs, said heating elements being provided with shrouds extending into proximity to the perpheries of said disks.

ORANGE J. SALISBURY.